(12) United States Patent
Dimotsis et al.

(10) Patent No.: US 11,607,625 B2
(45) Date of Patent: Mar. 21, 2023

(54) WATER TREATMENT TANK WITH DISTRIBUTOR PLATE ASSEMBLY AND METHOD OF ASSEMBLY

(71) Applicant: Ecowater Systems LLC, Woodbury, MN (US)

(72) Inventors: George L. Dimotsis, Woodbury, MN (US); Christopher James Fangman, Red Wing, MN (US); Mark Joseph Sowada, Plymouth, MN (US); Malcolm Kahn, Franklin Lakes, NJ (US)

(73) Assignee: Ecowater Systems LLC, Woodbury, MN (US)

( * ) Notice: Subject to any disclaimer, the term of this patent is extended or adjusted under 35 U.S.C. 154(b) by 854 days.

(21) Appl. No.: 16/394,231

(22) Filed: Apr. 25, 2019

(65) Prior Publication Data

US 2020/0338471 A1    Oct. 29, 2020

(51) Int. Cl.
*B01D 15/22* (2006.01)
*B01D 24/12* (2006.01)
*B01J 47/022* (2017.01)

(52) U.S. Cl.
CPC ............. *B01D 15/22* (2013.01); *B01D 24/12* (2013.01); *B01J 47/022* (2013.01); *C02F 2201/002* (2013.01)

(58) Field of Classification Search
CPC ........ B01D 15/22; B01D 24/12; B01D 24/14; B01D 24/01; B01D 24/165; B01D 24/183; B01D 24/22; B01D 2029/033; B01J 47/022; B01J 49/06; B01J 49/53; B01J 49/90; C02F 2201/002; C02F 1/006; C02F 2301/022; C02F 2303/16; C02F 1/42; C02F 2303/14

USPC ....... 210/163, 164, 288, 293, 336, 456, 488, 210/498
See application file for complete search history.

(56) References Cited

U.S. PATENT DOCUMENTS

| | | | |
|---|---|---|---|
| 3,762,559 A | * | 10/1973 | Knoy .................... B01D 24/12 210/293 |
| 5,529,431 A | * | 6/1996 | Walsh ................... E02D 29/124 210/164 |
| D591,823 S | | 5/2009 | Stolarik et al. |
| 9,051,196 B2 | | 6/2015 | Vaughan |
| 9,079,783 B2 | | 7/2015 | Vaughan |
| 10,472,251 B2 | | 11/2019 | Vaughan |
| 2005/0006393 A1 | | 1/2005 | Carter |

(Continued)

*Primary Examiner* — Jason M Greene
*Assistant Examiner* — Eric J McCullough
(74) *Attorney, Agent, or Firm* — Delio Peterson & Curcio LLC; Robert Curcio (57) ABSTRACT

A water treatment system, such as a water softening system, having a water treatment tank with at least one distributor plate mounted inside to support filter media and/or ion exchange resin. The water treatment system is designed to treat hard water with a packed ion-exchange filter media and has a distributor plate design for facilitating the ion-exchange within a water softener resin bed, as well as facilitating the regeneration of the resin bed. The distributor plate presents cavities to the topside for entrapping filter media, and the cavities have narrow slits located at the base for allowing fluid to pass. A method for assembling the water treatment tank and supporting inserted distributor plate is shown. The distributor plate rest on and is supported by a domed-shaped structure that can be placed in the bottom portion of the water treatment vessel.

32 Claims, 9 Drawing Sheets

(56) References Cited

U.S. PATENT DOCUMENTS

| | | |
|---|---|---|
| 2006/0060289 A1 | 3/2006 | Carter et al. |
| 2006/0289546 A1 | 12/2006 | Carter |
| 2008/0149636 A1 | 6/2008 | Carter et al. |
| 2009/0039009 A1 | 2/2009 | Stolarik et al. |
| 2009/0166273 A1* | 7/2009 | Mormino .................. C02F 1/42 |
| | | 210/107 |
| 2011/0073549 A1* | 3/2011 | Geibel .................. B01D 29/62 |
| | | 210/793 |

* cited by examiner

WATER TREATMENT TANK WITH DISTRIBUTOR PLATE ASSEMBLY AND METHOD OF ASSEMBLY

BACKGROUND OF THE INVENTION

1. Field of the Invention

The present invention relates to a water treatment system, and more particularly to a water softening system having a water treatment tank with at least one distributor plate mounted inside to support filter media and/or ion exchange resin. The water treatment system is designed to treat hard water with a packed ion-exchange filter media. The present disclosure also relates to a distributor plate design for facilitating the ion-exchange within a water softener resin bed, as well as facilitating the regeneration of the resin bed. The present invention further discloses a method for assembling the water treatment tank and supporting inserted distributor plate.

2. Description of Related Art

Hard water is a problem in many parts of the United States. Water is considered "hard" when it has a high concentration of dissolved minerals, specifically calcium and magnesium. While water is in the ground, it picks up soluble bits of whatever it passes through. While this can include contaminants that make the water unfit to drink, in many instances it simply means that the water contains minerals found in the earth. Of these, calcium and magnesium are of particular importance because they affect the water's ability to function in residential and commercial settings. These minerals make the water "hard."

Hard water is formed when water percolates through deposits of limestone and chalk which are largely made up of calcium and magnesium carbonates. Water hardness is determined by the concentration of multivalent cations in the water. Multivalent cations are positively charged metal complexes with a charge greater than 1+. Usually, the cations have the charge of 2+. Common cations found in hard water include $Ca^{2+}$ and $Mg^{2+}$. These ions enter a water supply by leaching from minerals, such as within an aquifer.

Typically, hard water classifications are shown using two common units: calcium in mg/l and grains per hardness. One grain of hardness equals 17.1 mg/l or ppm of hardness. Table I depicts water hardness classification as qualified by the Water Quality Association (WQA):

TABLE I

| Classification | mg/l or ppm | grains/gal |
| --- | --- | --- |
| Soft | 0-17 | 0-1 |
| Slightly hard | 17-60 | 1-3.5 |
| Moderately hard | 60-120 | 3.5-7 |
| Hard | 120-180 | 7-10.5 |
| Very hard | 180 and over | 10.5 and over |

Water containing calcium carbonate at concentrations below 60 mg/l is generally considered as soft or slightly hard; concentrations from 60-120 mg/l, moderately hard; concentrations from 120-180 mg/l, hard; and concentrations more than 180 mg/l, very hard.

Hard water used in appliances like washing machines, dishwashers, and the like, can significantly decrease their efficiency. For such appliances, water must be free from ions responsible for hardness. Ion-exchange water softeners have been implemented to remove hardness from water as a solution to this problem. Essentially, the ion-exchange water softeners work to remove the calcium and magnesium in the water.

The heart of a water softener is a mineral tank or water treatment vessel. It is typically filled with small polystyrene beads, also known as softener salts, resins, or zeolites. Generally, a large water treatment vessel containing softener salts is utilized for a water softener system. Water received in the household is filtered through the polystyrene beads, zeolite minerals, or the like, wherein calcium and magnesium ions are replaced with sodium ions. This is known as ion exchange. Ion exchange is the process through which ions in a solution are transformed to a solid which release ions of a different type but of the same polarity. This means that the ions in solutions are replaced by different ions originally present in the solid. This is a physical separation process in which the ions exchanged are not chemically altered.

Cation exchange water softeners remove the calcium and magnesium ions found in hard water by exchanging them with sodium (or potassium) ions. Once all the ions are fully exchanged, the water softener must then undergo a regeneration process to flush the system of excess ions and recharge with new sodium ions.

The polystyrene beads are designed to carry a negative charge. Calcium and magnesium in water both carry positive charges. When hard water is passed through the resin bed, the calcium and magnesium ions have a stronger positive charge than sodium ions. As a result, the calcium and magnesium have a stronger attraction to the negatively charged resin bed than the sodium. The sodium ion is then replaced on the resin bead with the calcium and magnesium taking its place. The sodium ion becomes unattached from the resin bed and moves to the solution taking the place of the calcium and magnesium ions. As a result, the less desirable calcium and magnesium ions are exchanged for more desirable sodium ions.

In this manner, calcium and magnesium ions in the water are transferred to the beads which in turn get saturated with the minerals. Once saturated, the beads will lose their ion-exchange capacity to remove magnesium or calcium ions. Thereupon, the resin beads must be regenerated to its sodium form with a salt or brine solution. During regeneration, the ion exchange resin is soaked with a strong solution of sodium chloride (brine) where the high concentration of the salt in the brine solution causes the calcium and magnesium ions in the resin beads to become dislodged. At the same time, the sodium in the brine solution again becomes affixed to the resin bead. After regeneration, the excess brine and hardness causing ions are rinsed to drain and the resin beads are once again ready to be used.

In operation, a water treatment vessel must accommodate this ion exchange interaction, and the ability to regenerate the resin bed. Generally, water treatment systems are designed to ensure that bed regeneration is effected prior to the point of exhaustion of the ion-exchange material.

In U.S. Pat. No. 5,378,370 issued to Brane, et al., on Jan. 3, 1995, titled "WATER TREATMENT TANK," a water softening system is disclosed which is operative in a treatment mode to receive untreated water through an inlet port and pass treated water through an outlet port, and which is operative in a regenerative (backwash) mode. This treatment tank has a vessel with an interior cavity which is partitioned into a top headspace portion, a middle treatment bed space portion, and a bottom headspace portion, via the placement of a pair of distributor plates or filters mounted within the interior cavity to extend between the side walls thereof. The treatment bed space portion between the first and the second distributor filter is filled with an ion-exchange resin, and a portion of the top headspace portion is filled with a particulate filter medium supported by the first distributor filter. The distributor plates are mounted within the interior cavity of the tank, and spaced apart. The distributor plates are constructed of circular grating with spaced apart, concentrically circular wall portions. In this design, a mesh screen is required to extend through the circular grating in order to retain the ion-exchange resin within the treatment bed space. These screens are typically a polyester fabric. Thus, the distributor plates themselves are not designed to retain the ion-exchange material.

One consideration for a co-flow regeneration ion exchanger regardless of how the regeneration is established involves exhaustion of the resin bed. If the resin bed is permitted to become completely exhausted of its capability of exchanging ions, a single regeneration cycle will not be sufficient to establish the original capacity of the bed. Instead, several regeneration cycles often will be required.

Typically, a water softening system comprises an exchange medium in a water treatment tank which is in fluid communication with a brine storage tank for regeneration purposes. In this manner, the exchange medium may be subjected to backwashing with the brine.

In U.S. Pat. No. 7,901,576, issued to Stolarik, et al., titled "COMPOSITE WATER TREATMENT VESSEL INCLUDING LIQUID DISTRIBUTOR PLATES," a water treatment vessel is taught having a thermoplastic liner, a reinforcing layer over the thermoplastic liner, and a distributor plate. Radial slits are formed in the distributor plate disc to define fluid flow passages through the disc between the central opening and the perimeter edge. Importantly, the fluid flow passages through the disc are adapted to swirl fluid flowing through the disc from the bottom side to the top side around the central opening. To achieve this swirling motion, each of the radial slits of the distributor plate is narrower in width at the top side of the disc than at the bottom side of the disc, with the fluid being bounded by a first longitudinal sidewall substantially perpendicular to the top side of the disc, and a second longitudinal sidewall having a concave profile in cross-section. In contrast, as discussed in detail below, the design of the distributor plate of the present invention does not desire nor promote a swirling fluid motion.

SUMMARY OF THE INVENTION

Bearing in mind the problems and deficiencies of the prior art, it is therefore an object of the present invention to provide a water filter in which all the media resides above the lower distributor for effective utilization.

It is another object of the present invention to provide a uniform flow through the filter media in both flow directions to maximize media utilization.

A further object of the invention is to provide a means for up flow/counter flow regeneration which does not generate mixing or moving of the filter media to maximize media regeneration efficiency/utilization.

It is yet another object of the present invention to provide a method for producing a pressure vessel/device that incorporates the advantages of the present invention.

Still other objects and advantages of the invention will in part be obvious and will in part be apparent from the specification.

The above and other objects, which will be apparent to those skilled in the art, are achieved in the present invention which is directed to a fluid treatment vessel comprising: an upper vessel portion having an aperture; a lower vessel portion attached to the upper vessel portion in a fluid-tight seal; a sub-assembly insertable within the lower vessel portion, the sub-assembly including: a distributor plate having a top side, a bottom side, a perimeter edge, and a central opening, and cavities formed on the top side, the cavities formed from sidewalls, and a cavity base, and having at least one slit or aperture located approximate the base for fluid flow through the cavity; and a support structure for receiving and holding the distributor plate bottom side at least at the distributor plate perimeter edge; and a fluid transfer tube in fluid communication with the distributor plate central opening and the aperture.

The distributor plate top side includes a first plurality of chords traversing across the distributor plate in a first direction and a second plurality of chords traversing across the distributor plate in a second direction perpendicular to the first direction, the first and second plurality of chords forming the sidewalls of the cavities, and extending to the perimeter edge.

The perimeter edge forms the sidewalls of the cavities adjacent the perimeter edge.

The first plurality of chords has a cross-section of an isosceles trapezoid with a first chord base located below the distributor plate top side and internal to the distributor plate.

Preferably, each side of the isosceles trapezoid forming one of the sidewalls for the cavities, respectively.

The distributor plate bottom side may include a third plurality of chords traversing across the distributor plate in the first direction and a fourth plurality of chords traversing across the distributor plate in the second direction, the third and fourth plurality of chords extending to the perimeter edge.

The third plurality of chords each have a top side that forms the cavity base for the cavities.

The first and second plurality of chords may be integrally formed.

The third and fourth plurality of chords may be integrally formed.

The distributor plate includes a cylindrical sleeve extending from the central opening, the cylindrical sleeve in mechanical communication with the fluid transfer tube.

The third plurality of chords has a cross-section of an isosceles trapezoid with a base located below the distributor plate top side and internal to the distributor plate.

In a second aspect, the present invention is directed to a distributor plate for a water softener system comprising: a top distributor plate portion having a top side and a bottom side, the top side including a plurality of cavities exposed on thereon, the cavities formed from a first plurality of chords traversing across the distributor plate in a first direction and a second plurality of chords traversing across the distributor plate in a second direction perpendicular to the first direction, such that the first and second plurality of chords form sidewalls of the cavities, and extend to a perimeter edge of the distributor plate.

In a third aspect, the present invention is directed to a method of assembling a water treatment vessel comprising: attaching a distributor plate having a top portion, a bottom portion, and a peripheral outside edge to a distributor plate support structure, the support structure having an extension segment extending radially inwards to seat the bottom portion of the peripheral outside edge of the distributor plate, and a domed-shaped bottom edge; attaching a fluid transport tube to the distributor plate; placing the distributor plate, the distributor plate support structure, and the fluid transport tube in a bottom portion of the water treatment vessel such that the water treatment vessel bottom portion, having a domed-shaped bottom end, receives the domed-shaped bottom of the distributor plate support structure; attaching an upper portion of the water treatment vessel to the water treatment vessel bottom portion in a fluid-tight seal; and applying an outer covering to the water treatment vessel.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-11 of the drawings in which like numerals refer to like features of the invention.

Figure 1:
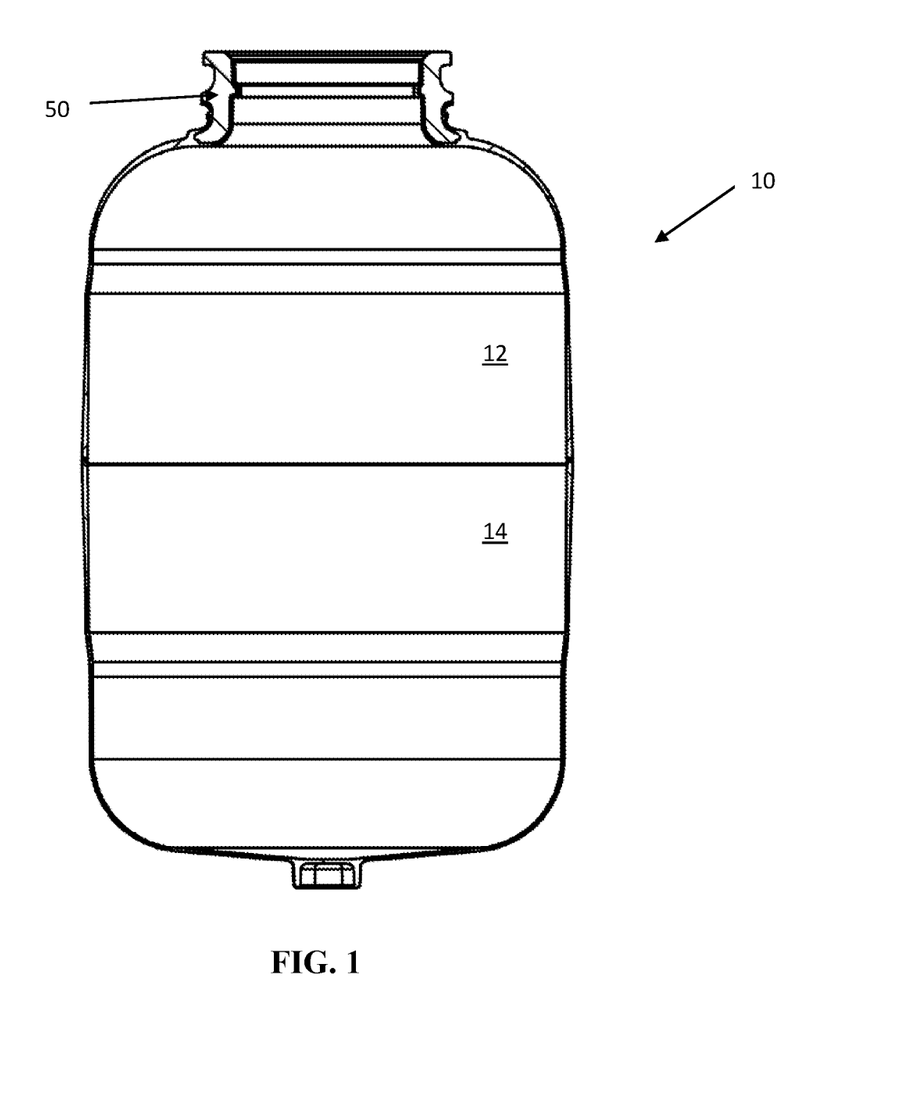
FIG. 1 depicts the composite water treatment pressure vessel liner of the present invention.

In the present invention, a water filtration system provides for a housing having at least one type of filter media enclosed therein that internally supports at least one distributor plate. More specifically, the present invention is used in water softener applications. As depicted in FIG. 1, a liner 10 of the water treatment housing or vessel forms (when assembled and combined with a structural overwrap layer) a composite pressure vessel that is preferably formed from two similar liner sections 12, 14 attached at approximately the housing mid-section, and bonded or welded together so as to form a fluid-tight seal. The composite pressure vessel 10 is preferably comprised of a thermoplastic liner (tank) that is overwrapped with a reinforcing layer. The thermoplastic liner is typically formed of a polymer, such as a high density polymer (HDPE) liner. The liner halves are bonded together. The reinforcing layer is typically comprised of glass filaments and epoxy in a fiberglass mixture is then overwrapped on the liner. The composite pressure vessel 10 is depicted as a cylindrically shaped vessel formed from two symmetrical halves that are bonded at approximately the vessel's midpoint although other geometric configurations are possible, and bond points other than the vessel's midpoint are also possible, such that the present invention is not limited to a particular geometric configuration or a midpoint bond seal.

In the preferred embodiment, the tank top is dome-shaped and includes an insert, injection molded tank neck 50. Similarly, the tank bottom is preferably also dome-shaped. In at least one embodiment, each domed-shaped portion is formed with a cylindrical shell portion that comprises the body of the tank top or tank bottom. The two halves are spin-welded together, and as shown in FIG. 1, at an approximate mid-point of the vessel. Other means of attachment, such as laser welding, thermally bonding, and the like, can achieve a sufficient bond of the tank top and bottom.

The vessel is preferably constructed using a thermoplastic, polypropylene, or polyethylene liner, or other thermally formable/moldable plastic material, and may be extruded or injection molded. As depicted in FIG. 1, the tank is a combination of two cylindrical bodies, each comprising the thermoplastic, polypropylene liner that when combined share the same central axis. In a preferred embodiment, the end portions of each cylindrical body are formed concurrently with the cylindrical bodies, that is, there are no separate end portions or end caps that would otherwise require additional welding.

Figure 2:
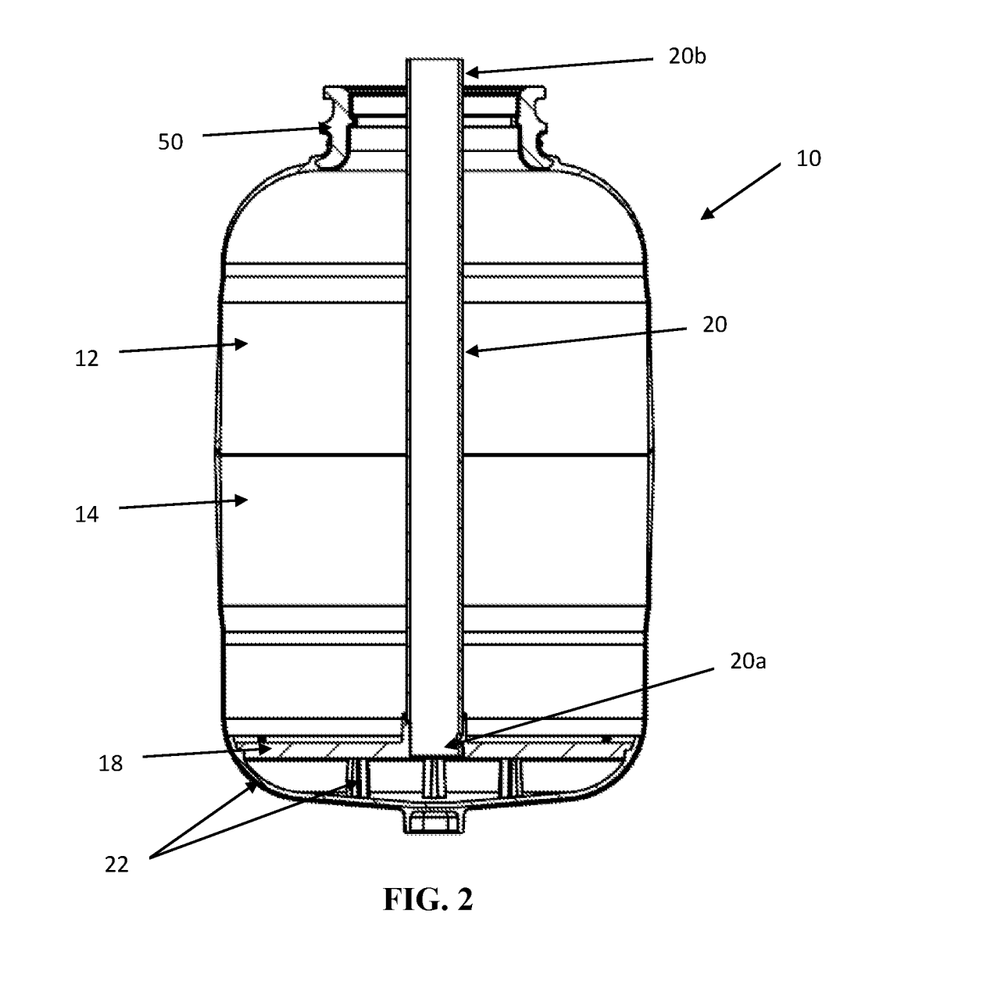
FIG. 2 depicts a cross-sectional view of the water treatment pressure vessel liner of FIG. 1 depicting the placement of the inner structures including the distributor plate (the outer epoxy fiberglass wrap is not shown)

In the present design, the bottom half of the injection molded tank has a distributor plate 18 inserted within it. Distributor plate 18 is situated on the bottom surface of the lower half 14 of vessel 10. FIG. 2 depicts a cross-sectional view of vessel 10 depicting the placement of distributor plate 18.

Distributor plate 18 has a diameter approximately equal to the inner diameter of the vessel 10 at a lower portion of vessel lower half 14. A fluid transport tube 20 is held in place at a bottom end 20a by a center aperture or opening in distributor plate 18, and extends at a top end 20b through tank neck 50. Distributor plate 18 seats in a support structure 22. Support structure 22 is preferably bowl- or domed-shaped on its bottom facing end to match correspondingly with the top inner surface of the domed-shaped bottom of the vessel lower half portion 14.

Figure 3:
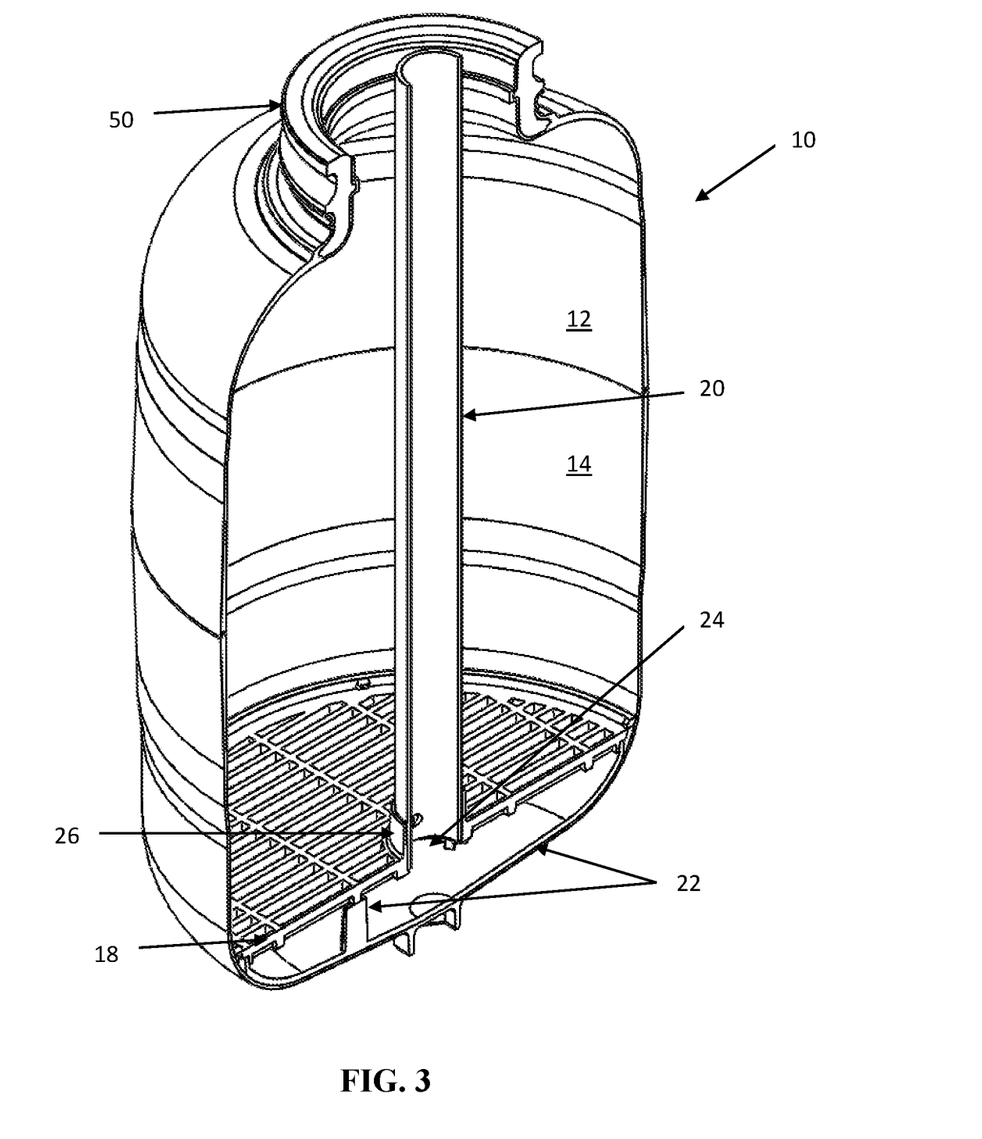
FIG. 3 is a perspective, cross-sectional view of the water treatment pressure vessel liner of FIG. 1 depicting the placement of the inner structures including the distributor plate as well as the attachment of a fluid transport tube to the distributor plate/support structure combination.

FIG. 3 is a perspective, cross-sectional view of vessel 10 depicting the attachment of fluid transport tube 20 to the distributor plate/support structure combination (18, 22). In the embodiment depicted by FIG. 3, central aperture 24 includes a cylindrical sleeve 26 comprising a receiving tube segment for receiving fluid transport tube 20 at its bottom end 20a. Fluid transport tube bottom end 20a is slidably or threadably received by sleeve 26, forming a fluid-tight seal. Support structure 22 may include posts 28 to provide structural bracing for distributor plate 18 at locations between its axial center and its edge.

Figure 4:
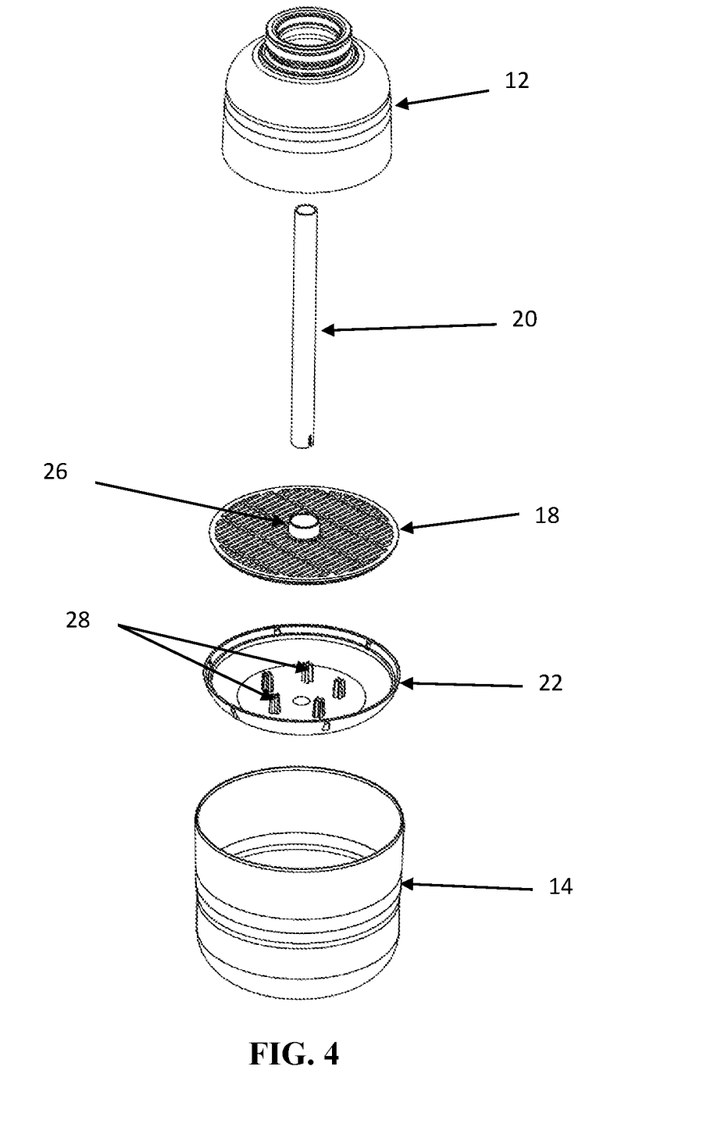
FIG. 4 is a perspective, exploded view of the water treatment pressure vessel liner of FIG. 1 depicting the assembly of the major components.

FIG. 4 is a perspective, exploded view of vessel 10 depicting the assembly of the major components.

The distributor plate 18 for the composite pressure vessel 10 is preferably designed as a thermoplastic polymeric disc having a top side, a bottom side, a perimeter edge, and a central opening. Other materials may be used for the distributor plate provided the materials do not adversely interact with either the fluid or the filter media/resin bed material, and provide for a sufficiently robust structure to withstand the fluid and filter media/resin weight.

Figure 5:
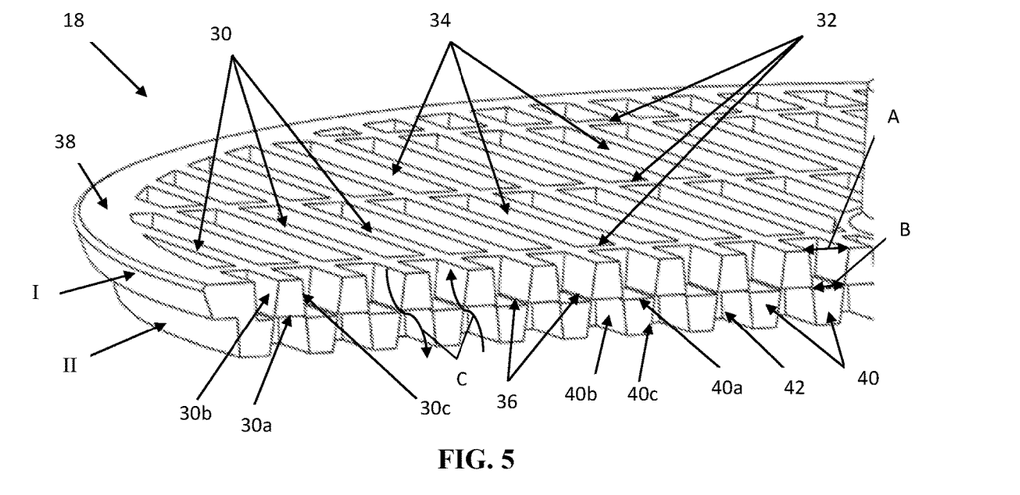
FIG. 5 depicts a partial, cross-sectional, perspective view of a preferred embodiment of the distributor plate of the present invention.

FIG. 5 depicts a partial, cross-sectional, perspective view of distributor plate 18. The distributor plate is preferably formed having a top plate portion I and a bottom plate portion II. These may be separate portions attached or placed together, or preferably integrally formed together. Top plate portion I and bottom plate portion II together form rows of upwardly facing wells for receiving and retaining filter media/resin on the topside of distributor plate 18, and form narrow fluid passage slits or apertures 36 at the bottom edges of each upwardly facing well or cavity, slits 36 being situated at the interface of top plate portion I and bottom plate portion II. As discussed in further detail below, the base of well or cavity 34 is formed by a top surface of lower chord 40 of bottom plate portion II, that traverses the bottom plate portion II in a similar fashion, and direction, as upper chord 30 traverses the top plate portion I. The upper chord 30 and lower chord 40 are spaced apart in a direction outwards from the distributor plate center so that each lower chord 40 provides a floor or upwardly facing surface for the well formed by two adjacent upper chords 30.

The upper surface of top plate portion I includes a plurality of chords 30 traversing across the circular distributor plate 18 in one direction, and a plurality of chords 32 traversing across the distributor plate 18 in a direction perpendicular to chords 30, such that a lattice of upwardly facing wells or cavities 34 are formed. It is understood that the distributor plate, and thus the chords, may be formed from a mold, such as an injection molded construct, and as such the chords providing the lattice structure may be integrally formed with one another. Each set of adjacent chords 30 and adjacent chords 32 together form the sidewalls of upwardly facing wells or cavities 34 that are designed to receive and retain filter media/resin. In some instances, sidewalls of wells 34 at the outer periphery of the distributor plate are formed in part by edge 38. Sidewalls formed by edge 38 are curved at approximately the radius of the distributor plate 18.

As depicted in FIG. 5, chords 30 have a cross-section of an isosceles trapezoid with base 30a at the bottom, and sides 30b,c that angle outwards, away from the respective chord's topmost edge, and downwards from the distributor plate top surface, such that each two adjacent chords 30 form an upwardly facing well or cavity 34 in the shape of an inverted isosceles trapezoid having its open-faced "base" or larger width portion at the top. In cross-section, each well or cavity 34 has a larger opening exposed to the top surface of distributor plate 18, the width indicated by arrow A, and a smaller opening formed by the bottom (lower) angled ends of chords 30, the width of the smaller opening indicated by arrow B.

Chords 32 form the end wall segments of cavity 34 except at the outermost reaches of the distributor plate, where a circumferential edge 38 forms an end wall segment or in some instances a curved sidewall segment for the wells lying on the outer periphery.

In at least one embodiment, chords 40 located in the bottom plate portion II have a similar cross-section as chords 30 of the top plate portion I, with the exception that the cross-section directional shape of chord 40 is inverted with respect to chord 30, that is, the cross-section of chord 40 is an isosceles trapezoid with its base 40a facing upwards towards top plate portion I, and having sides 40b,c that angle inwards, from the respective chord's bottom most edge, and downwards from the distributor plate top surface, such that each two adjacent chords 40 form a downwardly facing well 42 in the shape of an isosceles trapezoid having its widest portion or "base" at the top. In cross-section, each well 42 has a larger opening exposed to the bottom surface of distributor plate 18, and an opposing smaller opening formed by the top angled ends of chords 40.

The base 40a of chord 40 has a width that is less than the width of the narrowest portion of well 34, which is denoted by Arrow B, such that when the top portion of chord 40 (base 40a) is presented as the floor of well 34, there remain narrow apertures or slits 36 between the bottom edge of each adjacent chord 30 (base 30a) and top edge of chord 40 (base 40a). Slits 36 are designed for fluid flow through distributor plate 18, as denoted by directional arrows C.

Figure 6A:
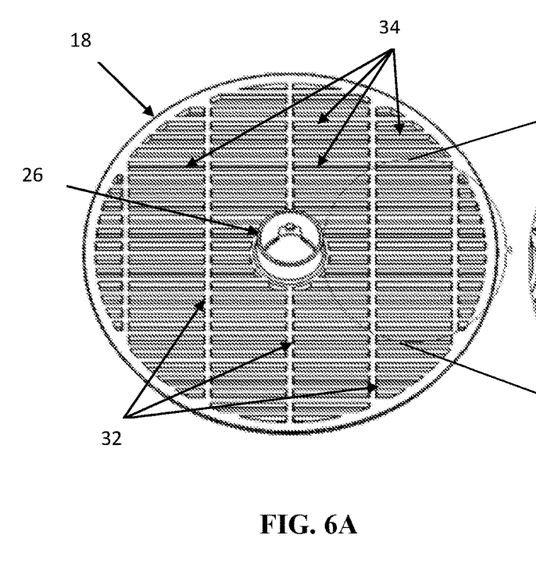
FIG. 6A is a top perspective view of the distributor plate of FIG. 5, depicting rows of wells exposed to the top surface of the distributor plate, the wells presenting a rectangular aperture to the top surface, and forming inverted isosceles trapezoidal cavities separated by chords.
Figure 6B:
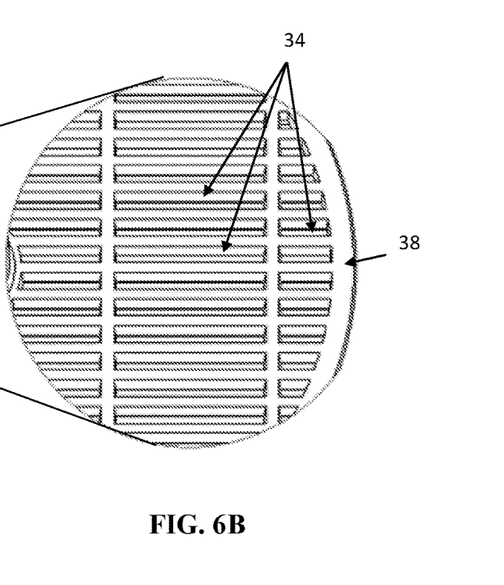
FIG. 6B is an exploded view of a portion of the distributor plate of FIG. 6A.

FIG. 6A is a top perspective view of distributor plate 18 depicting rows of wells or cavities 34 exposed to the top surface of distributor plate 18, the wells or cavities 34 presenting a rectangular aperture to the top surface, and forming inverted isosceles trapezoidal cavities separated by chords 32. FIG. 6B is an exploded view of a portion of the distributor plate of FIG. 6A.

As noted above, chords 40 form the end wall segments of well 34 except at the outermost reaches of the distributor plate, where a circumferential edge 38 forms an end wall, segment or in some instances a curved sidewall segment, for the wells lying on the outer periphery.

Figure 7A:
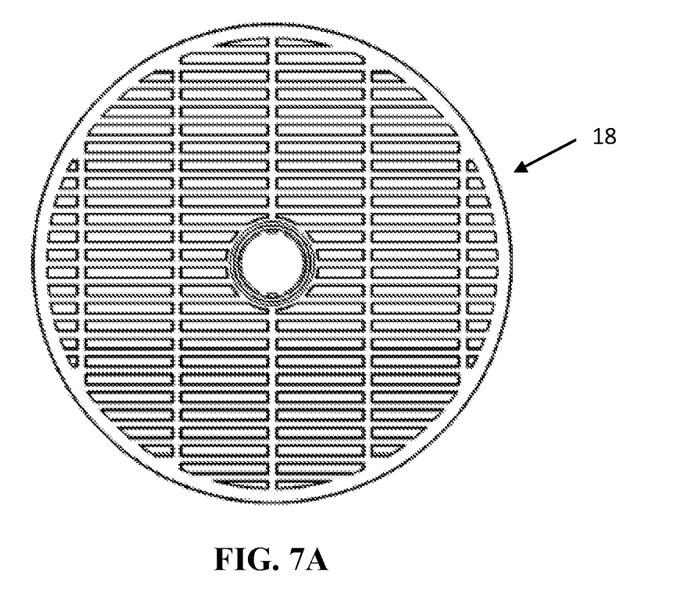
FIG. 7A depicts a top view of the distributor plate of FIGS. 4 & 5.
Figure 7B:
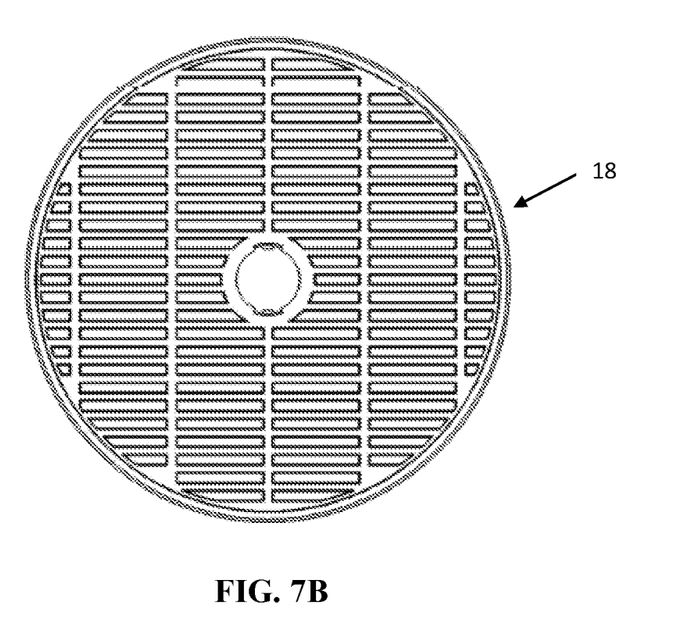
FIG. 7B depicts a bottom view of the distributor plate of FIG. 7A.

FIG. 7A depicts a top view of distributor plate 18. FIG. 7B depicts a bottom view of distributor plate 18.

Figure 8:
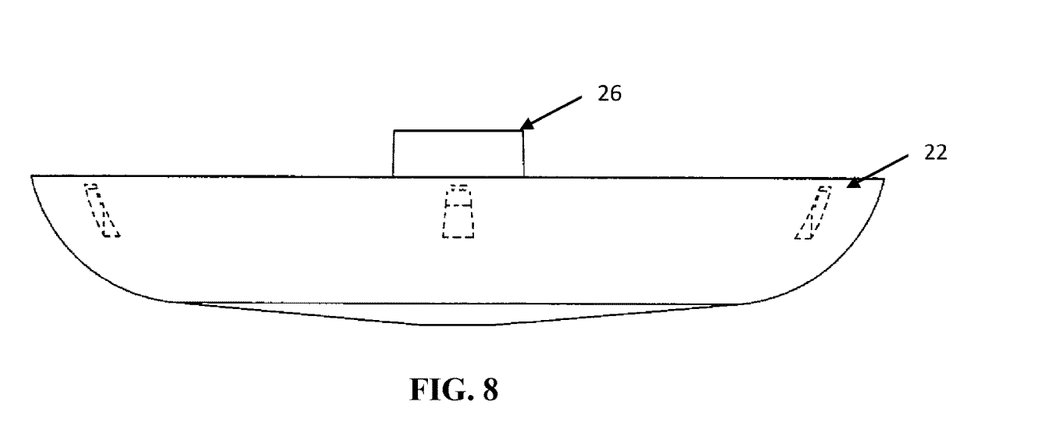
FIG. 8 is a sideview of the distributor plate support structure 22 with the distributor plate inserted.
Figure 9:
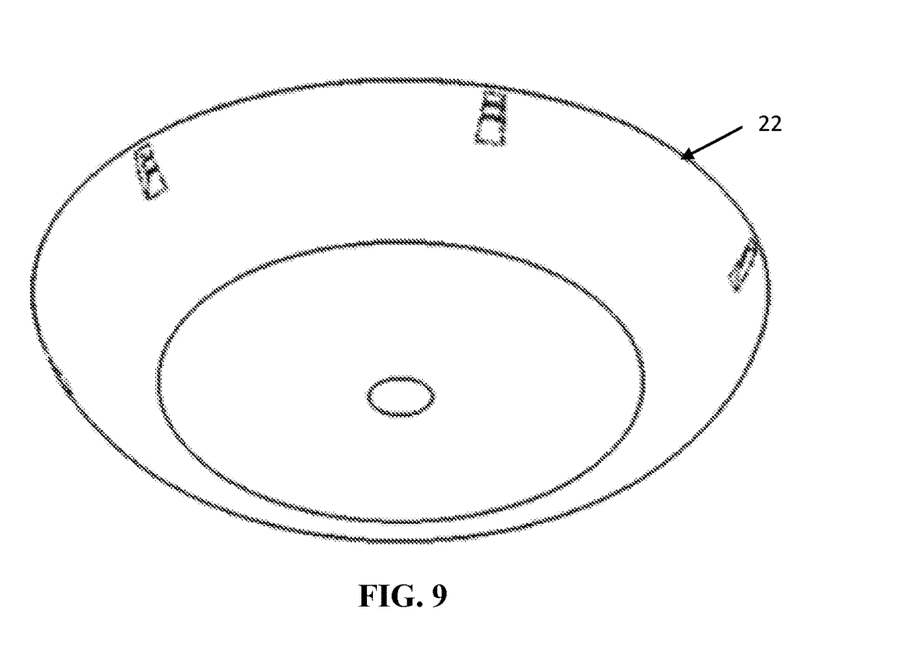
FIG. 9 is a bottom perspective view of the support structure of FIG. 8.

FIG. 8 is a sideview of the distributor plate support structure 22 with distributor plate 18 held therein. In this view, sleeve 26 can be seen above the rim of support structure 22. Preferably, the bottom of support structure 22 is shaped to fit the inside bottom of vessel lower half 14, both shown here as domed-shaped. Support structure 22 may simply be placed in vessel lower half 14 or secured thereto. FIG. 9 is a bottom perspective view of support structure 22.

Figure 10:
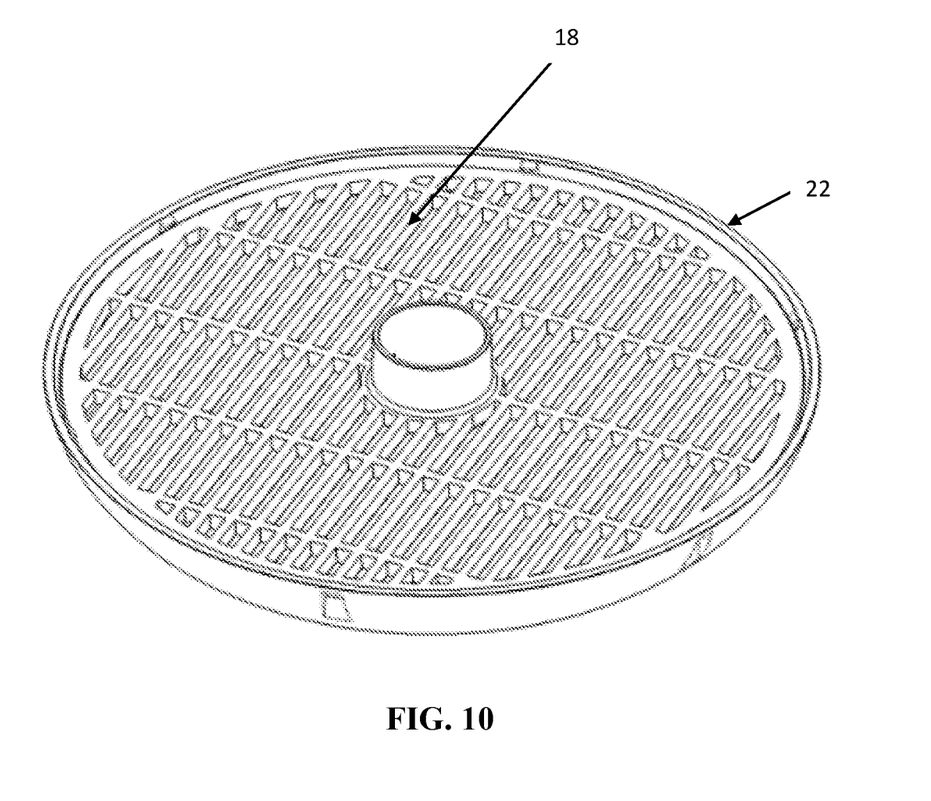
FIG. 10 depicts a top perspective view of the distributor plate and support structure assembly.

FIG. 10 depicts a top perspective view of the distributor plate 18 and support structure 22 assembly.

It is noted that the distributor plate may be molded as a single structure or formed from the attachment of top plate portion I to bottom plate portion II. Once the top and bottom disc portions are secured together, fluid flow passages or slits 36 are formed upon alignment of the alternating quadrilateral structures as shown in FIG. 5.

Assembly of the vessel with the distributor plate and support structure is best described in reference to FIG. 4. The distributor plate 18 is attached to support structure 22. Support structure 22 includes a circumferential ledge extending radially inwards to seat a bottom portion of the outside edge 38 of distributor plate 18. Fluid transport tube 20 is then inserted within sleeve 26 and the subassembly is placed within the vessel lower half 14. Preferably there is no attachment of the subassembly to the vessel lower half 14; however, a friction or snap fit attachment to the inner wall of the vessel may be performed, and is not precluded by the present invention. Vessel upper half 12 is then secured to vessel lower half 14 in a fluid-tight seal. Attachment may be performed by bonding or welding the halves together; however, the design is not limited solely to welding. Other airtight, watertight seals may be utilized. An outer covering is then applied to the assembled vessel, preferably a fiberglass covering 52; however, the present invention is not limited to any specific protective outer covering.

Figure 11:
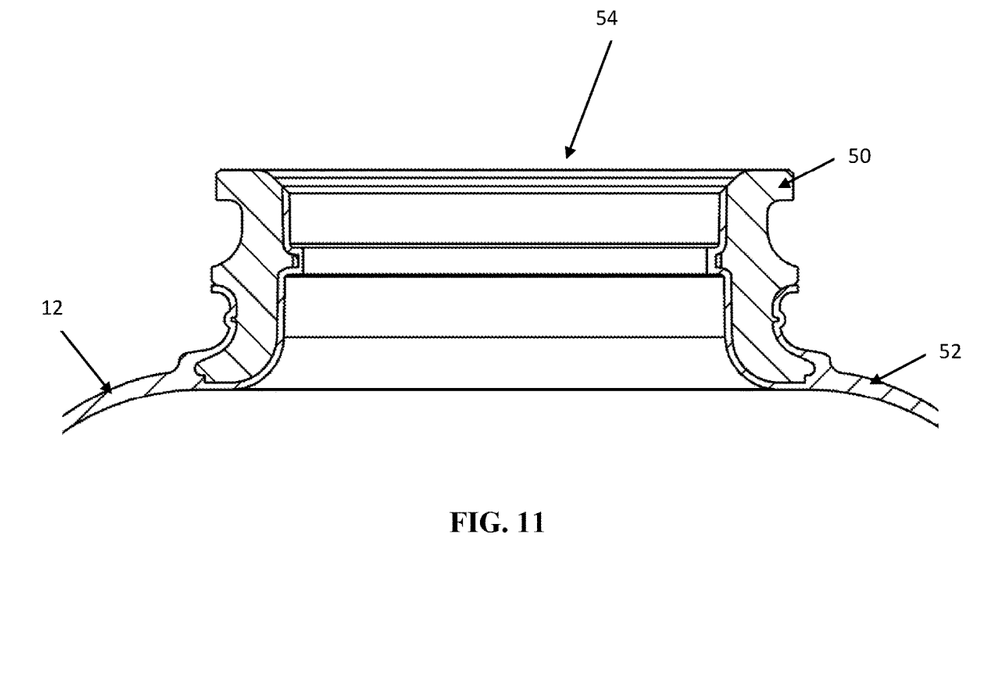
FIG. 11 depicts a partial, cross-sectional view of the vessel liner upper half showing the neck and outlet assembly with the through-hole fitting secured thereto.

FIG. 11 depicts a partial, cross-sectional view of the vessel upper half 12 with through-hole fitting 50 secured thereto without the epoxy/fiberglass outer wrap. In a first embodiment of the present invention, the top portion of the vessel includes through-hole fitting 50 presenting an aperture 54. The through-hole fitting 50 is fitted and bonded to the vessel upper half 12. The reinforced fiberglass layer need not be removed in order to form the aperture for insertion of the through-hole fitting 50, and certainly not removed once the through-hole fitting 50 is secured in place. In this embodiment, the proposed design does not require the removal of the outer reinforced layer after the through-hole fitting 50 is attached.

The through-hole fitting 50 is preferably a glass-filled structure to match the liner material, such as HDPE/HDPE or polypropylene/polypropylene material (so that they melt and fuse together in the molding process), and which is subsequently wrapped within a high-density polyethylene (HPDE) liner 52, wherein the HPDE liner encompasses a fiberglass wrapping.

Regeneration of the resin bed is performed by having fluid flow in the opposite direction through the narrow slits in the distributor plate allowing the resin held in place by the distributor plate to replenish. The straight-through nature of the fluid flowing through the narrow slits allows the fluid to directly impinge upon the resin bed. In this manner, the present design lends itself to water softener applications.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A fluid treatment vessel comprising
an upper vessel portion having an aperture;
a lower vessel portion attached to said upper vessel portion in a fluid-tight seal;
a sub-assembly insertable within said lower vessel portion, said sub-assembly including:
a distributor plate having a top side, a bottom side, a perimeter edge, and a central opening, and cavities formed on said top side, said cavities formed from sidewalls, and a cavity base, and having at least one slit or aperture located approximate said base for fluid flow through said cavity; and
a support structure for receiving and holding said distributor plate bottom side at least at said distributor plate perimeter edge; and
a fluid transfer tube in fluid communication with said distributor plate central opening and said aperture.

2. The fluid treatment vessel of claim 1 wherein said distributor plate top side includes a first plurality of chords traversing across said distributor plate in a first direction and a second plurality of chords traversing across said distributor plate in a second direction perpendicular to said first direction, said first and second plurality of chords forming said sidewalls of said cavities, and extending to said perimeter edge.

3. The fluid treatment vessel of claim 2 further including said perimeter edge forming said sidewalls of said cavities adjacent said perimeter edge.

4. The fluid treatment vessel of claim 2 wherein said first plurality of chords has a cross-section of an isosceles trapezoid with a first chord base located below said distributor plate top side and internal to said distributor plate.

5. The fluid treatment vessel of claim 4 wherein each side of said isosceles trapezoid forming one of said sidewalls for said cavities, respectively.

6. The fluid treatment vessel of claim 2 wherein said distributor plate bottom side includes a third plurality of chords traversing across said distributor plate in said first direction and a fourth plurality of chords traversing across said distributor plate in said second direction, said third and fourth plurality of chords extending to said perimeter edge.

7. The fluid treatment vessel of claim 6 wherein said third plurality of chords each have a top side that forms said cavity base for said cavities.

8. The fluid treatment vessel of claim 2 wherein said first and second plurality of chords are integrally formed.

9. The fluid treatment vessel of claim 6 wherein said third and fourth plurality of chords are integrally formed.

10. The fluid treatment vessel of claim 1 wherein said distributor plate includes a cylindrical sleeve extending from said central opening, said cylindrical sleeve in mechanical communication with said fluid transfer tube.

11. The fluid treatment vessel of claim 6 wherein said third plurality of chords has a cross-section of an isosceles trapezoid with a base located below said distributor plate top side and internal to said distributor plate.

12. The fluid treatment vessel of claim 1 wherein said lower vessel portion includes a domed shaped bottom end and cylindrical body.

13. The fluid treatment vessel of claim 12 wherein said domed shaped bottom end and said cylindrical body are integrally formed.

14. The fluid treatment vessel of claim 12 wherein said support structure comprises a domed shaped bottom end for placement within said lower vessel portion domed shaped bottom end.

15. The fluid treatment vessel of claim 14 wherein said support structure domed shaped bottom end includes at least one post extending upwards from said support structure domed shaped bottom end to support said distributor plate.

16. The fluid treatment vessel of claim 1 wherein said vessel is a water softener apparatus.

17. The fluid treatment vessel of claim 16 including ion exchange resin held in said vessel by said distributor plate.

18. The fluid treatment vessel of claim 17 wherein at least a portion of said ion exchange resin is held within said cavities.

19. A distributor plate for a water softener system comprising:
a top distributor plate portion having a top side and a bottom side, said top side including a plurality of cavities exposed on thereon, said cavities formed from a first plurality of chords traversing across said distributor plate in a first direction and a second plurality of chords traversing across said distributor plate in a second direction perpendicular to said first direction, such that said first and second plurality of chords form sidewalls of said cavities, and extend to a perimeter edge of said distributor plate;

wherein said first plurality of chords has a cross-section of an isosceles trapezoid with a base located below said distributor plate top side and internal to said distributor plate.

20. The distributor plate of claim 19 including said perimeter edge forming said sidewalls of said cavities adjacent said perimeter edge.

21. The distributor plate of claim 19 wherein each side of said isosceles trapezoid forms a sidewall for said cavities, respectively.

22. The distributor plate of claim 19 wherein said distributor plate includes a bottom side comprising a third plurality of chords traversing across said distributor plate in said first direction and a fourth plurality of chords traversing across said distributor plate in said second direction, said third and fourth plurality of chords extending to said perimeter edge.

23. The distributor plate of claim 19 wherein said first and second plurality of chords are integrally formed.

24. The distributor plate of claim 22 wherein said third and fourth plurality of chords are integrally formed.

25. A method of assembling a water treatment vessel comprising:
attaching a distributor plate having a top portion, a bottom portion, and a peripheral outside edge to a distributor plate support structure, said support structure having an extension segment extending radially inwards to seat said bottom portion of said peripheral outside edge of said distributor plate, and a domed-shaped bottom edge;
attaching a fluid transport tube to said distributor plate;
placing said distributor plate, said distributor plate support structure, and said fluid transport tube in a bottom portion of said water treatment vessel such that said water treatment vessel bottom portion, having a domed-shaped bottom end, receives said domed-shaped bottom of said distributor plate support structure;
attaching an upper portion of said water treatment vessel to said water treatment vessel bottom portion in a fluid-tight seal; and
applying an outer covering to said water treatment vessel.

26. The method of claim 25 wherein said distributor plate includes a cylindrical sleeve about a central aperture, said cylindrical sleeve receiving said fluid transport tube.

27. The method of claim 25 wherein attachment of said upper portion of said water treatment vessel to said bottom portion of said water treatment vessel is performed by bonding or welding.

28. The method of claim 25 wherein applying said outer covering includes applying a fiberglass covering to said water treatment vessel.

29. A fluid treatment vessel comprising
an upper vessel portion having an aperture;
a lower vessel portion attached to said upper vessel portion in a fluid-tight seal;
a sub-assembly insertable within said lower vessel portion, said sub-assembly including:
a distributor plate having a top side, a bottom side, a perimeter edge, and a central opening, and cavities formed on said top side, said cavities formed from sidewalls, and a cavity base, and having at least one slit or aperture located approximate said base for fluid flow through said cavity, said distributor plate supported proximate said lower vessel portion at said distributor plate bottom side at least at said distributor plate perimeter edge; and
a fluid transfer tube in fluid communication with said distributor plate central opening and said aperture;
wherein said distributor plate top side includes a first plurality of chords traversing across said distributor plate in a first direction and a second plurality of chords traversing across said distributor plate in a second direction perpendicular to said first direction, said first and second plurality of chords forming said sidewalls of said cavities, and extending to said perimeter edge; and
wherein said first plurality of chords has a cross-section of an isosceles trapezoid with a first chord base located below said distributor plate top side and internal to said distributor plate.

30. The fluid treatment vessel of claim 29 wherein said distributor plate includes a cylindrical sleeve extending from said central opening, said cylindrical sleeve in mechanical communication with said fluid transfer tube.

31. The fluid treatment vessel of claim 29 wherein said lower vessel portion includes a domed shaped bottom end and cylindrical body.

32. The fluid treatment vessel of claim 31 wherein said distributor plate is supported by a domed shaped bottom end for placement within said lower vessel portion domed shaped bottom end.

* * * * *